(12) United States Patent
Schmid et al.

(10) Patent No.: US 8,974,199 B2
(45) Date of Patent: Mar. 10, 2015

(54) MIXED FLOW FAN

(75) Inventors: Harald Schmid, Emmingen-Liptingen (DE); Tobias Maier, Rottweil (DE); Martin Mueller, Seewald (DE); Matthias Weiss, Eberstadt (DE)

(73) Assignee: EBM-Papst St. Georgen GmbH & Co. KG, St. Georgen (DE)

( * ) Notice: Subject to any disclaimer, the term of this patent is extended or adjusted under 35 U.S.C. 154(b) by 638 days.

(21) Appl. No.: 13/294,106

(22) Filed: Nov. 10, 2011

(65) Prior Publication Data

US 2012/0177515 A1 Jul. 12, 2012

(30) Foreign Application Priority Data

Nov. 14, 2010 (DE) ...................... 20 2010 015 749 U

(51) Int. Cl.
*F04D 25/06* (2006.01)
*F04D 25/08* (2006.01)
*F04D 29/66* (2006.01)
*G01M 1/32* (2006.01)

(52) U.S. Cl.
CPC ............ *F04D 25/064* (2013.01); *F04D 29/662* (2013.01); *G01M 1/32* (2013.01)
USPC ..................................................... 417/423.7

(58) Field of Classification Search
CPC ... F04D 19/002; F04D 25/064; F04D 29/642; F04D 3/005; F04D 25/08; F04D 25/0633; F04D 25/0613; F04D 29/183; F04D 29/326; F04D 29/325; F03B 3/128; G01M 1/32
USPC ....................................................... 417/423.7
See application file for complete search history.

(56) References Cited

U.S. PATENT DOCUMENTS

| | | | |
|---|---|---|---|
| 2,829,287 A * | 4/1958 | Soler Font Eduardo | ........ 310/78 |
| 5,591,008 A | 1/1997 | Wrobel et al. | ................. 416/144 |

(Continued)

FOREIGN PATENT DOCUMENTS

| | | |
|---|---|---|
| DE | 41 36 293 A | 5/1992 |
| DE | 41 27 134 | 2/1993 |

(Continued)

OTHER PUBLICATIONS

Nat'l Instruments,"Two-Plane Balancing Using LABVIEW PDA etc" Jan. 18, 2011, pp. 1-7, available at website www.NI.com.

*Primary Examiner* — Bryan Lettman
(74) *Attorney, Agent, or Firm* — Milton Oliver, Esq.; Oliver Intellectual Property LLC

(57) ABSTRACT

A mixed-flow fan features a housing (42); an impeller (43) journaled rotatably with respect to the housing, and equipped with fan blades (54); a generally cylindrical air conduit (50) defined between the fan housing and the impeller, the fan blades extending into the air conduit in order, during operation, to transport air; an external-rotor motor (75) having an internal stator (100) and an external rotor (81) which includes a tubular ferromagnetic yoke (63) partly embedded in material of the impeller. A cup-shaped yoke (72) fits into a central cavity (68) of the tubular yoke (63) and accommodates a permanent magnet arrangement (66) which interacts with the stator. The tubular yoke (63) and the cup-shaped yoke (72) together serve as a magnetic return path for the external-rotor motor. The structure minimizes damage during final assembly, and simplifies insertion of balancing weights.

24 Claims, 14 Drawing Sheets

(56) References Cited

U.S. PATENT DOCUMENTS

Figure 1:
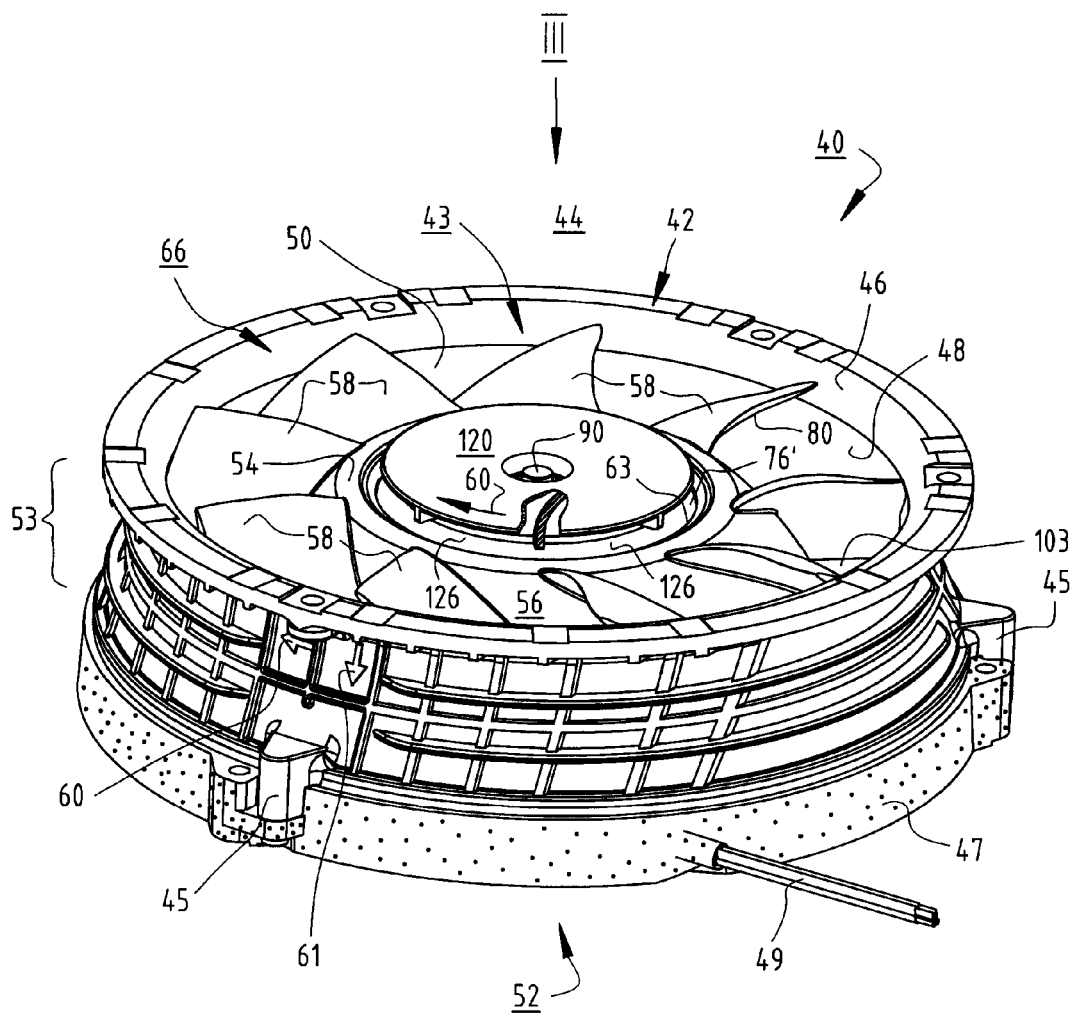

| | | | |
|---|---|---|---|
| 5,695,318 A * | 12/1997 | Harmsen | 415/218.1 |
| 6,168,734 B1 | 1/2001 | Botros | 264/40.1 |
| 7,063,507 B2 * | 6/2006 | Hsieh | 416/144 |
| 7,112,906 B2 * | 9/2006 | Chou et al. | 310/156.12 |
| 2008/0063542 A1 * | 3/2008 | Oguma | 417/354 |
| 2008/0131283 A1 | 6/2008 | Elsaesser et al. | 416/247 R |

FOREIGN PATENT DOCUMENTS

| | | |
|---|---|---|
| DE | 102006-057087 | 6/2008 |
| DE | 202010 013 785 U1 | 2/2011 |
| WO | WO 2011-038 884 A1 | 4/2011 |

* cited by examiner

MIXED FLOW FAN

CROSS-REFERENCE TO RELATED APPLICATION

This application claims priority from our German application DE 20 2010 015 749.8, which is hereby incorporated by reference.

FIELD OF THE INVENTION

The present invention relates to a mixed flow fan which outputs air partly in an axial direction and partly in a radial direction.

BACKGROUND

Such a mixed-flow or "diagonal" fan is known from DE 41 27 134 B4 and corresponding U.S. Pat. No. 5,695,318, HARMSEN, issued 9 Dec. 1997. The fan has a housing that defines, together with the fan wheel of the mixed flow fan, an air flow conduit, within which the fan blades provided on the fan wheel rotate. The fan wheel is also often referred to as an "impeller."

The enveloping curve of the fan wheel has, for example, a frusto-conical shape, or the shape of a spherical cap. If the drive motor is an external-rotor motor, the hub of the fan wheel is nonrotatably connected to the external rotor of the motor. There remains, between the outer side of the external rotor and the outer side of the fan wheel, an annular cavity, on whose periphery are provided pockets for insertion of balancing weights. It is well known, in the rotating machine art, that rotors wobble the least, and operate most smoothly, when the rotor's center of mass coincides with the central axis of the rotor, and supplemental balancing weights are inserted, when necessary, to adjust for undesired asymmetries which may occur due to manufacturing variations and the like.

SUMMARY OF THE INVENTION

It is an object of the invention to provide a novel mixed-flow fan structure.

According to the invention, this structural object is achieved with an external-rotor drive motor in which the rotor includes a tubular ferromagnetic yoke, embedded at one point in material of the impeller of the fan, and defining a central cavity in the impeller, into which fits a generally cup-shaped yoke having a permanent magnet arrangement inside, with the result that the permanent magnet arrangement magnetically interacts with the internal stator of the motor, and the tubular yoke and the cup-shaped yoke together serve as a ferromagnetic return path for the external-rotor motor.

The tubular ferromagnetic yoke performs, on the one hand, a magnetic function for the motor and, on the other hand, forms a kind of mechanical reinforcing backbone for the impeller; these functions do not interfere with one another. At the same time, this part also acts as a cooling element for the motor, which dissipates heat outward, and thereby tends to prevent or counteract formation of hot spots in the interior of the impeller.

Another manner of achieving the stated object is to structure the fan wheel with blades projecting outward from a generally concave or hemi-spherical hub formed with a first plurality of pockets for insertion of balancing weights, in a first plane near the air inlet end, and a second plurality of pockets for insertion of balancing weights, in a second plane near the air discharge or outlet end of the fan wheel, and to connect the respective portions, formed with the balancing pockets, by a first plurality of generally curved longitudinal ribs and at least one second rib, extending circumferentially, and connecting together the longitudinal first ribs. The facts that, on the one hand, ribs are provided in the annular cavity and extend therein from inside to outside and, on the other hand, that at least one rib proceeding in a circumferential direction is provided, which rib connects at least some of the ribs proceeding from inside to outside into a kind of ribbed vault, for example such as a reticulated vault, define between the ribs many small pockets that, in contrast to large pockets as found in the prior art, do not cause strong turbulence. The reason this novel structure was chosen is that strong turbulence would decelerate the fan wheel, and thereby cause a considerable power loss, which would decrease the fan performance and cause the external-rotor motor and its electronics to reach their upper performance limit already at low rotation speeds, so that the fan performance would be low.

In a mixed flow fan of this kind, the improved fan wheel can be manufactured with little outlay, for example as a cast or an injection-molded part, and once the fan wheel has been connected to the rotor of the external-rotor motor, it needs only to be balanced, which in this case is particularly simple, because balancing pockets for two parallel, spatially-separated, balancing planes (each orthogonal to the rotor axis) are reachable from the air-discharge side of the fan wheel. Procedures for two-plane balancing are known, for example from the document published Jan. 18, 2011 at the National Instruments website, www.ni.com, entitled "*Two-Plane Balancing Using LabVIEW PDA and NI CF-6004 CompactFlash Data Acquisition Card.*"

A further manner of achieving the stated object is to structure the external-rotor motor with an internal stator and an external rotor, the rotor including a tubular ferromagnetic yoke formed near the air inlet end with a splayed or widened end which is accessible, during the assembly process, from the air inlet side of the fan wheel. A smaller-diameter cup-shaped ferromagnetic yoke, which accommodates, in its interior, a permanent magnet arrangement, is adapted to be press-fitted into one end of the tubular yoke. The tubular yoke and the cup-shaped yoke together serve as a magnetic return path for the permanent magnet arrangement. Assembly of the fan is made substantially easier as a result of this configuration, since introduction of the cup-like ferromagnetic yoke into the tubular ferromagnetic yoke sometimes requires considerable force, which could result in damage to the impeller; and because the tubular ferromagnetic yoke is accessible from the outer side of the impeller, it can be braced directly from the outer side of the impeller so that, with this structure, no deforming mechanical forces are exerted on the impeller during assembly, and damage to the impeller is thus reliably avoided.

BRIEF FIGURE DESCRIPTION

Further details and advantageous refinements of the invention are evident from the exemplifying embodiments, in no way to be understood as a limitation of the invention, that are described below and depicted in the drawings.

Figure 2:
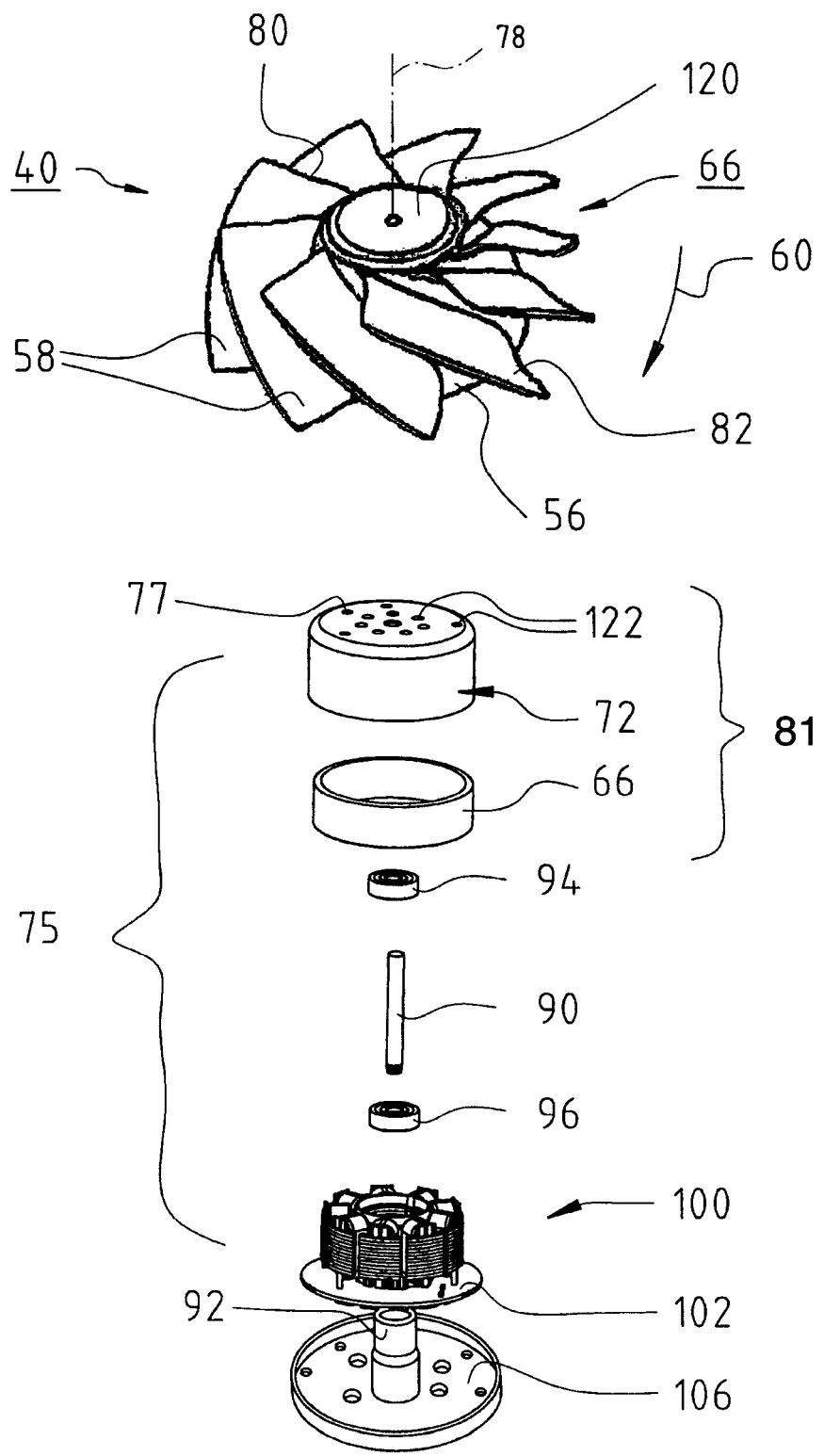
Figure 3:
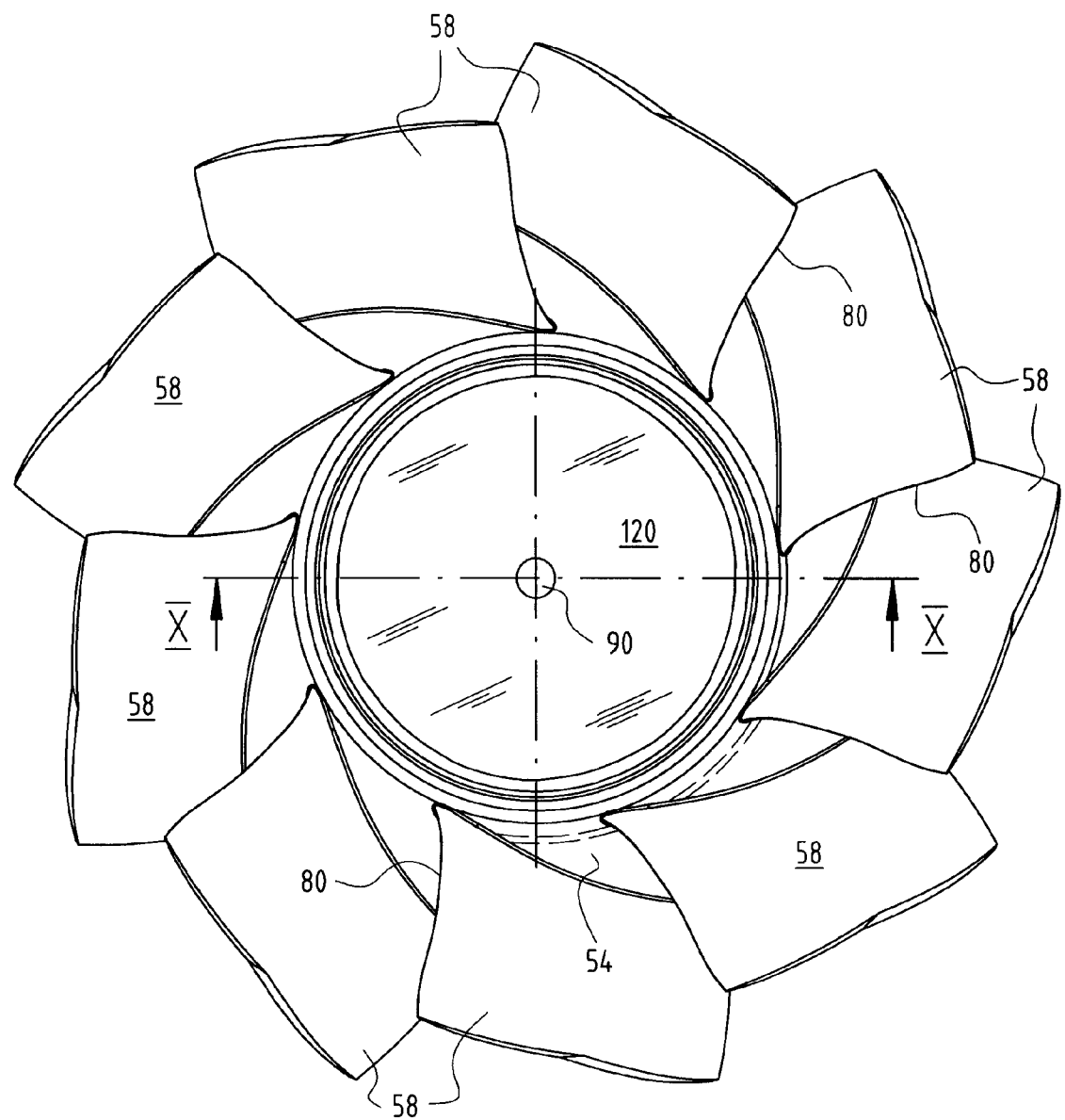
Figure 4:
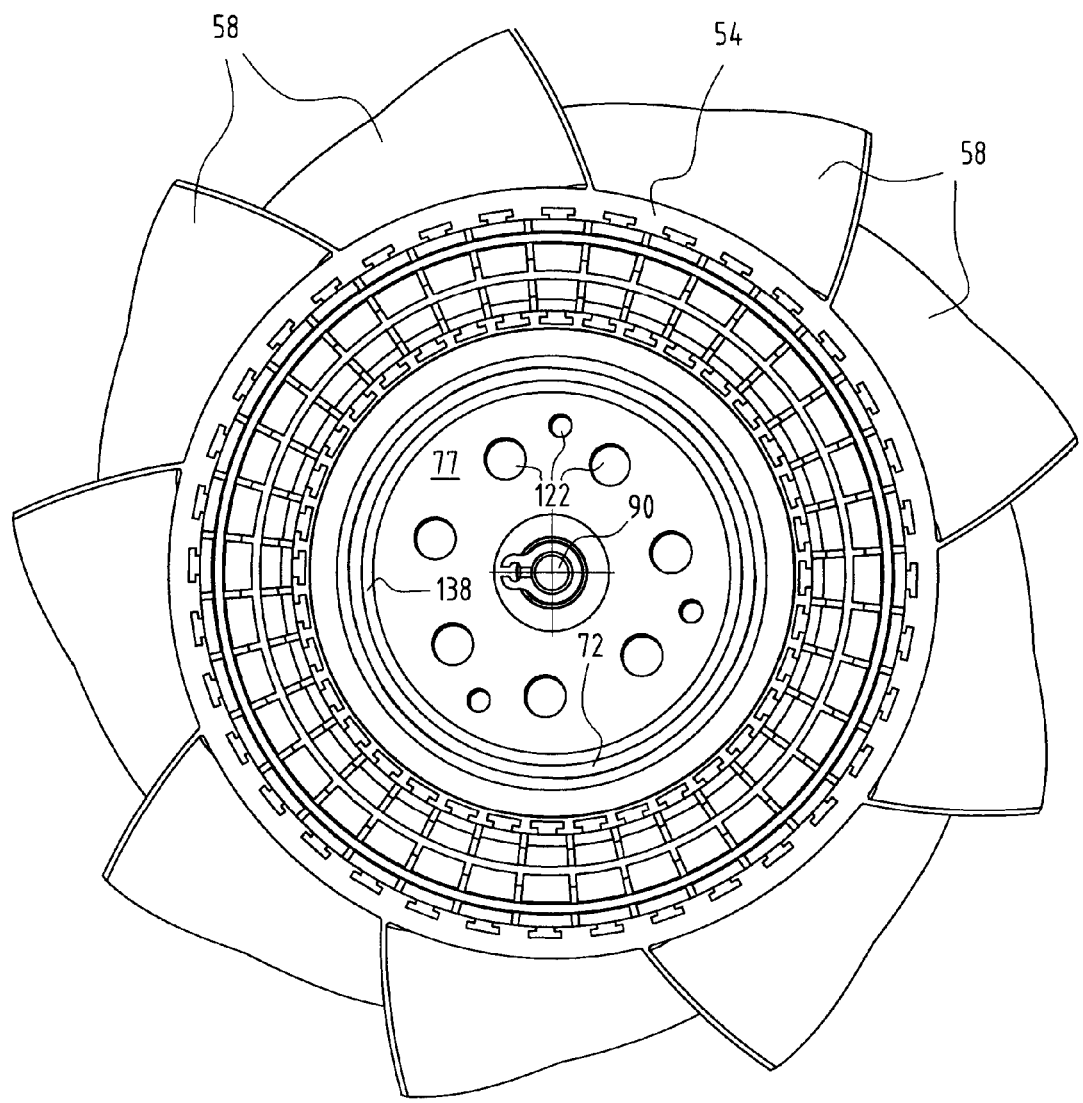
Figure 5:
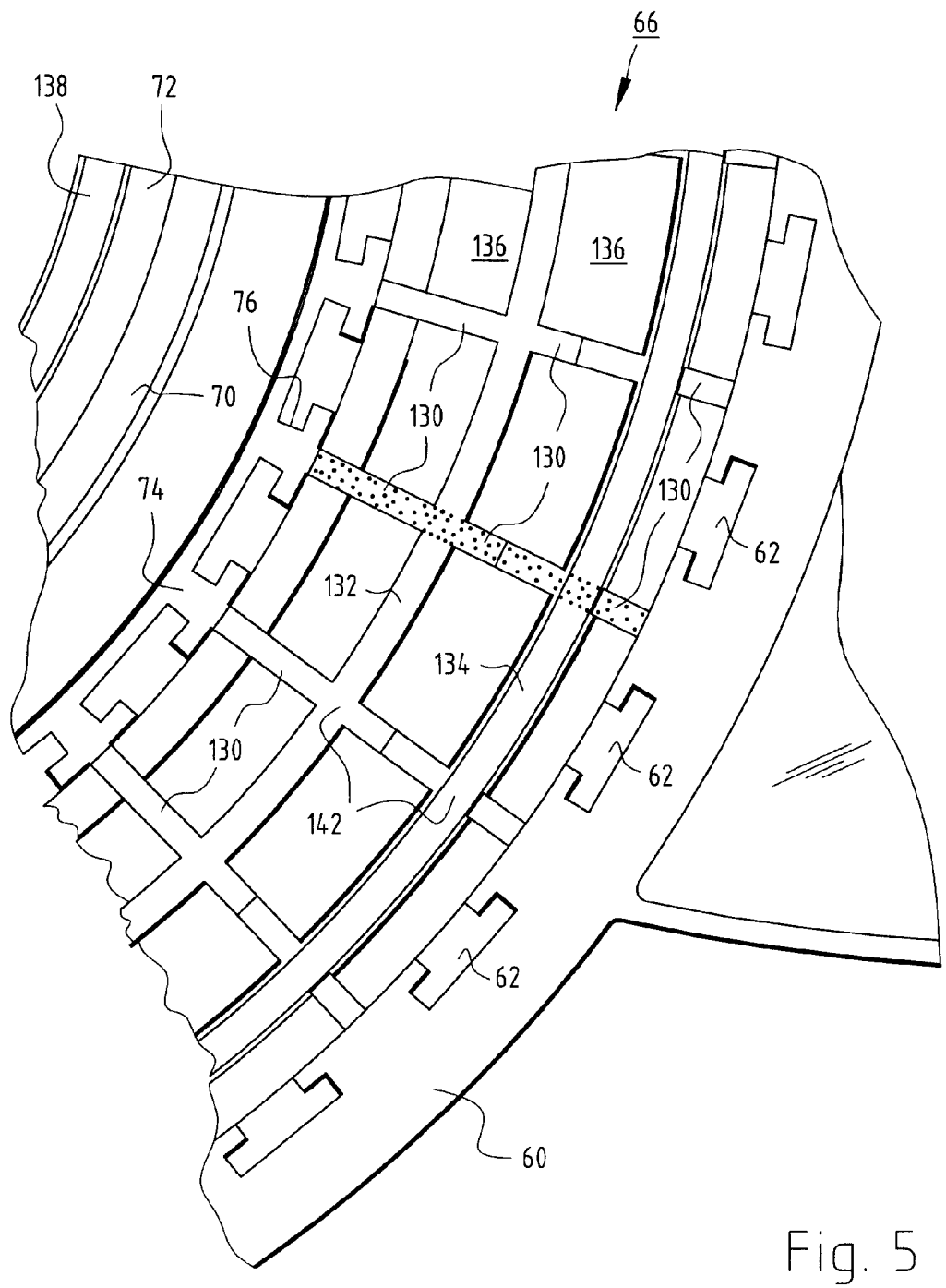
Figure 6:
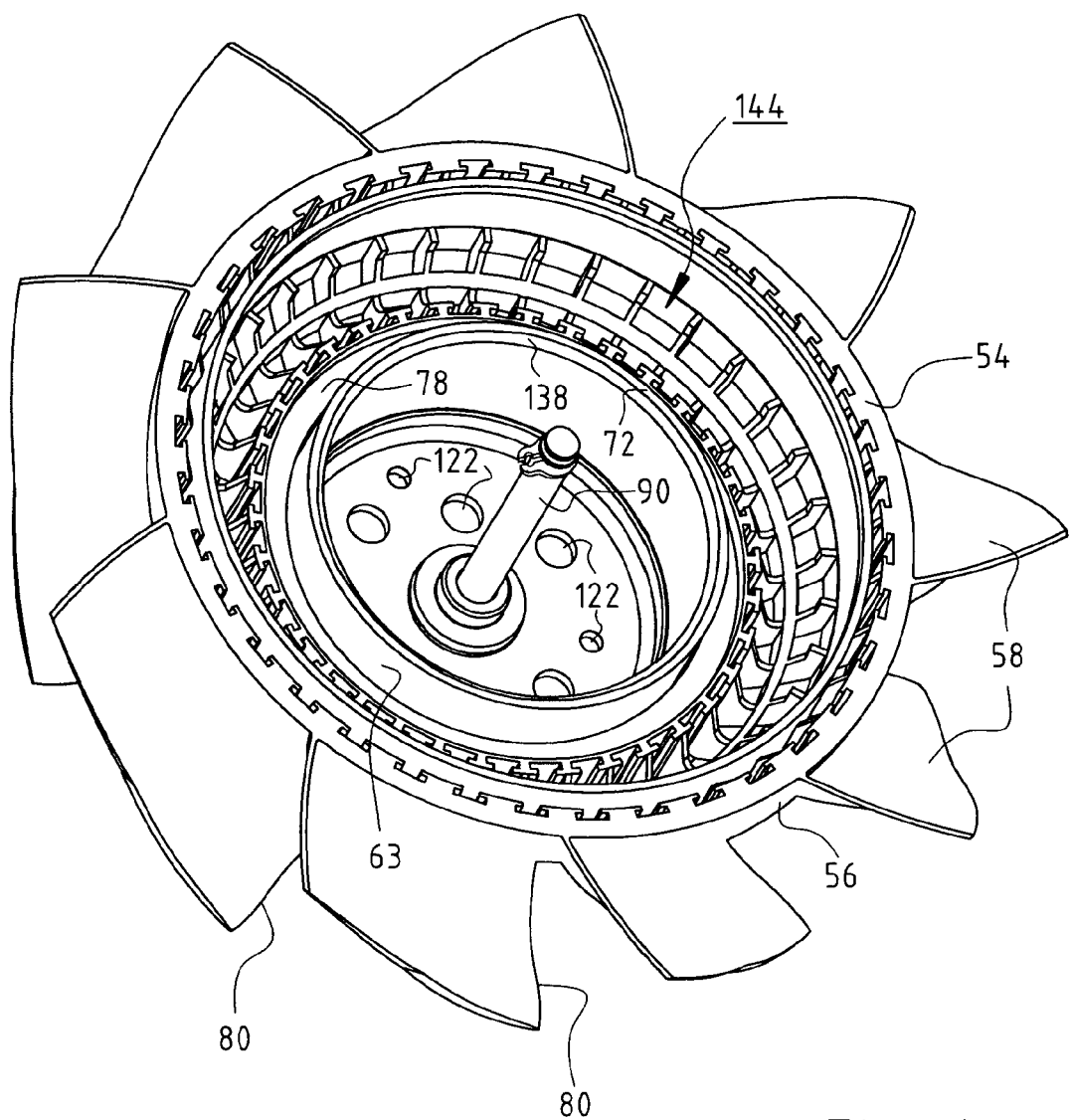
Figure 7:
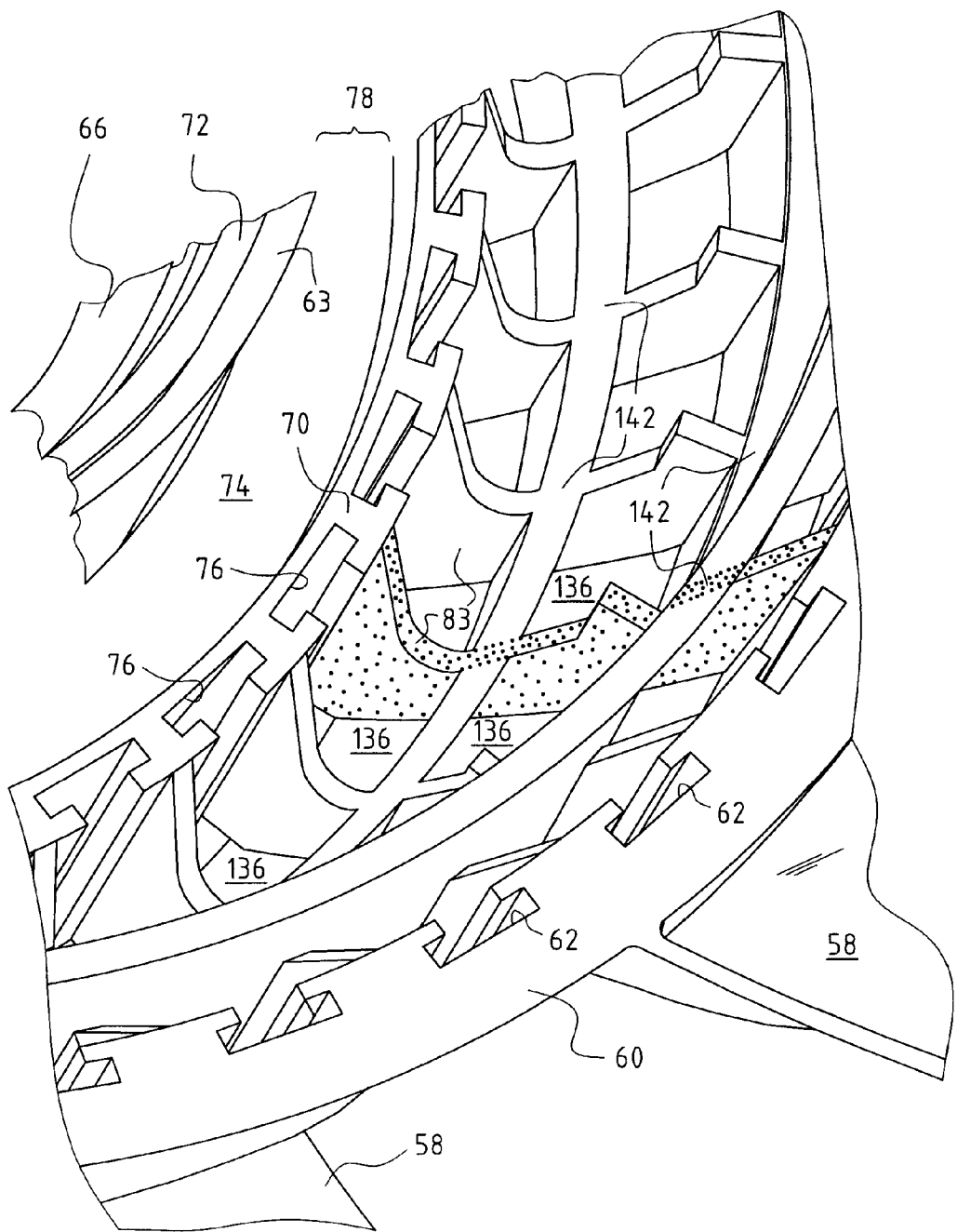
Figure 8:
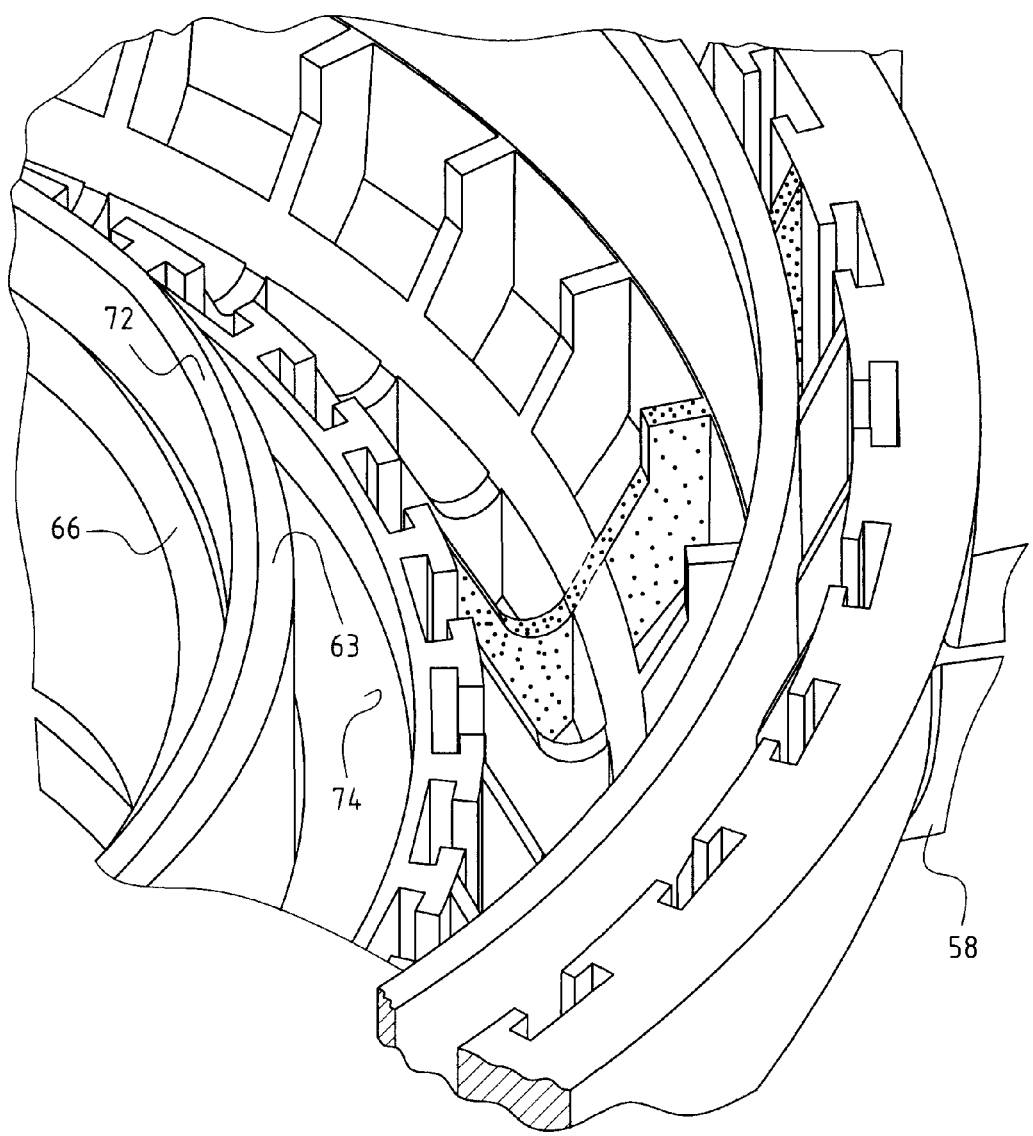
Figure 9:
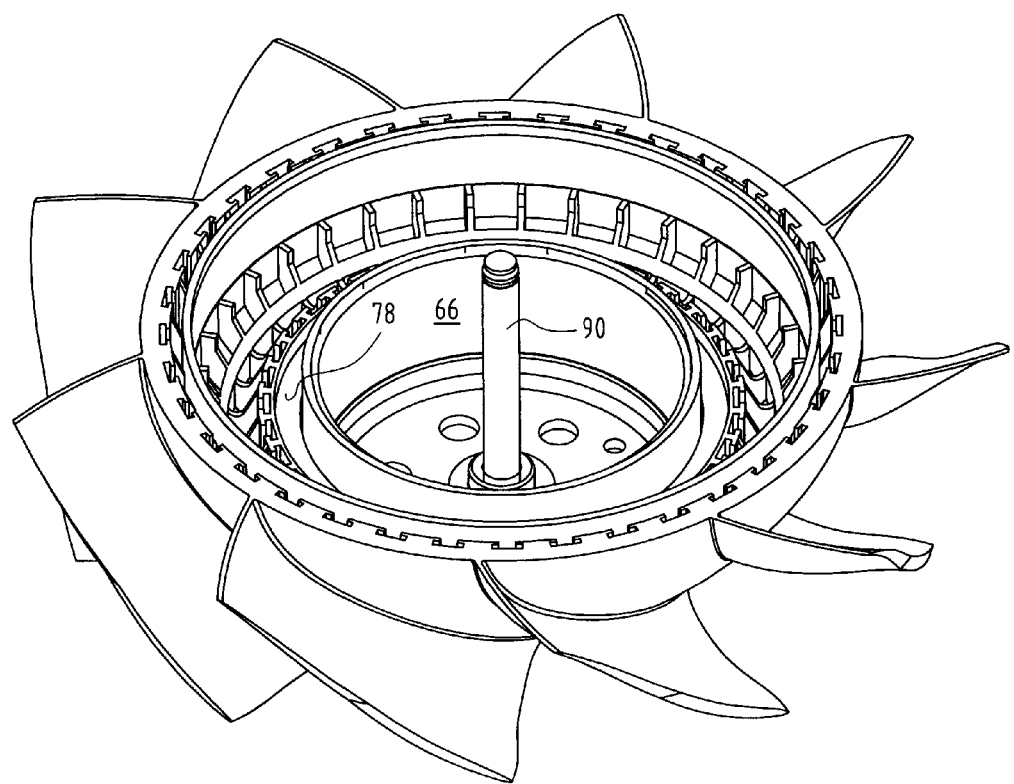
Figure 10:
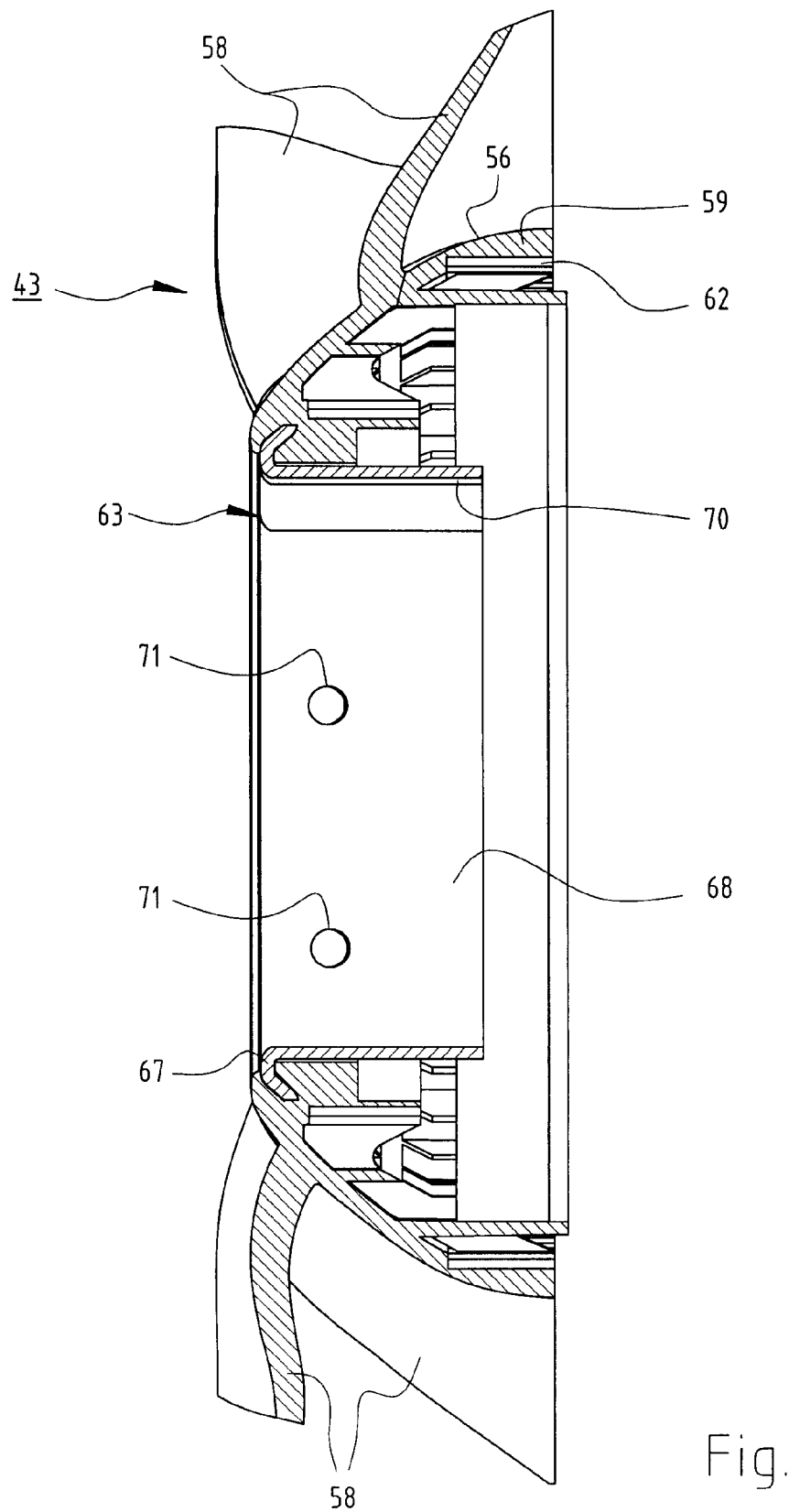
Figure 11:
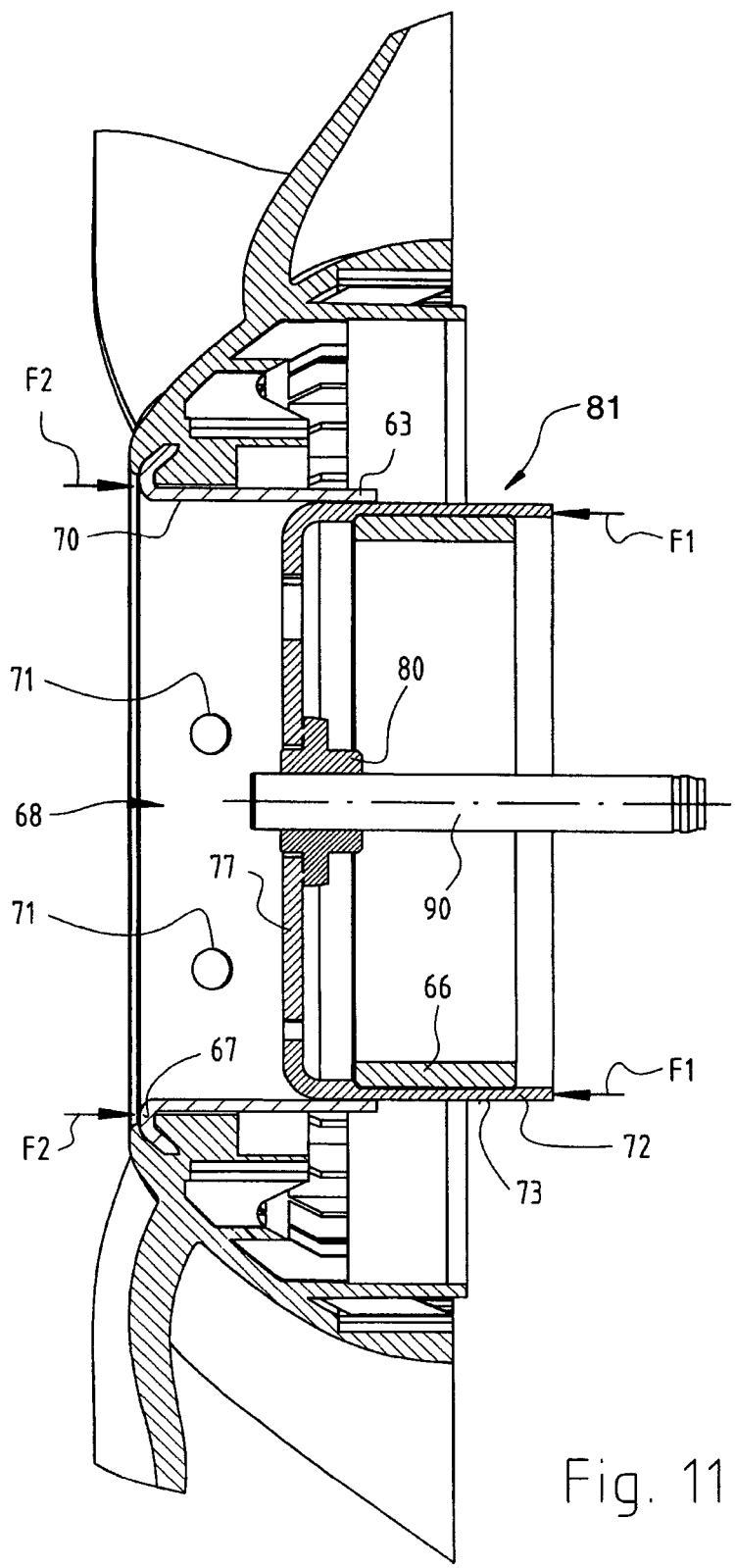
Figure 12:
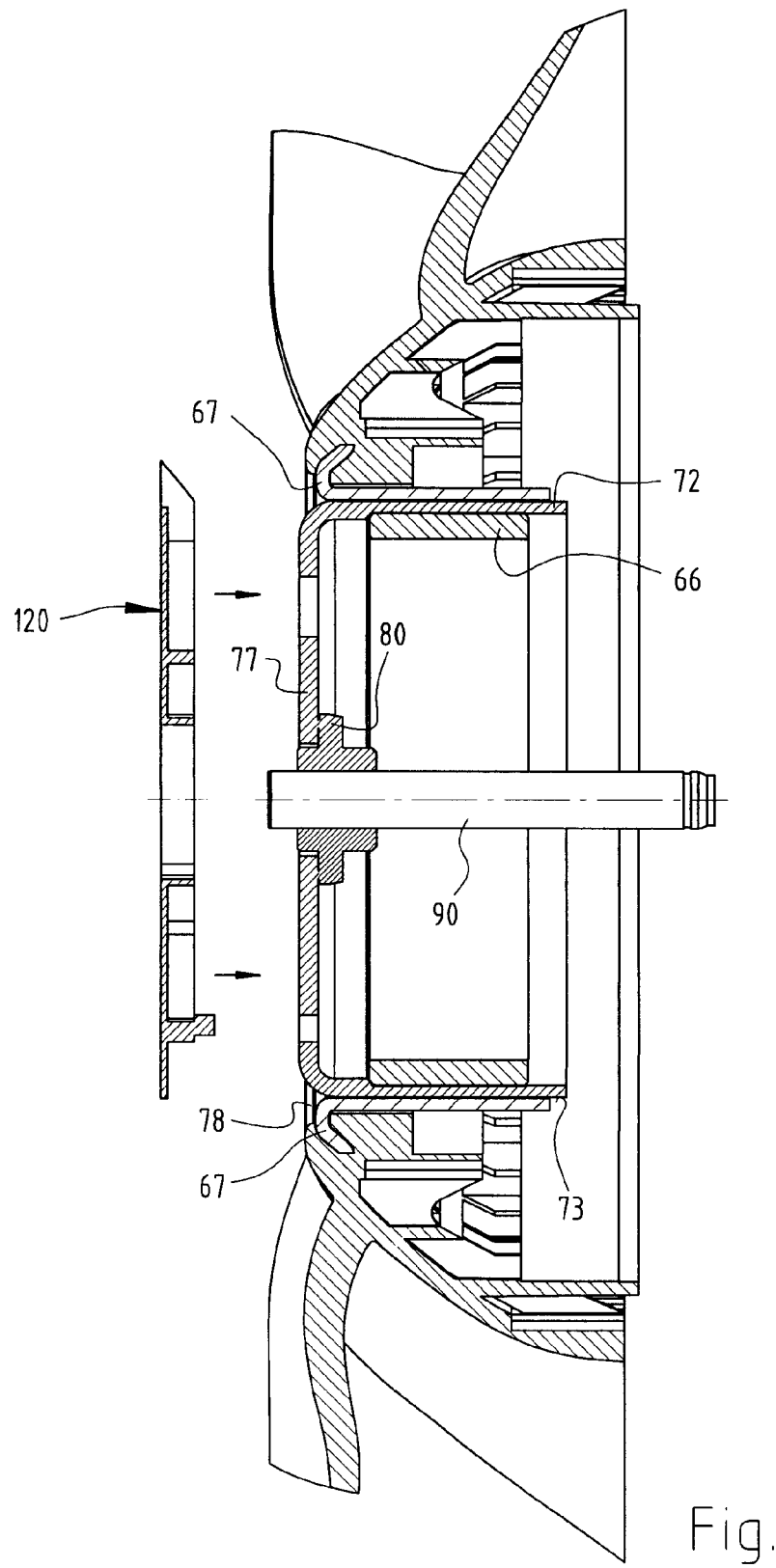
Figure 13:
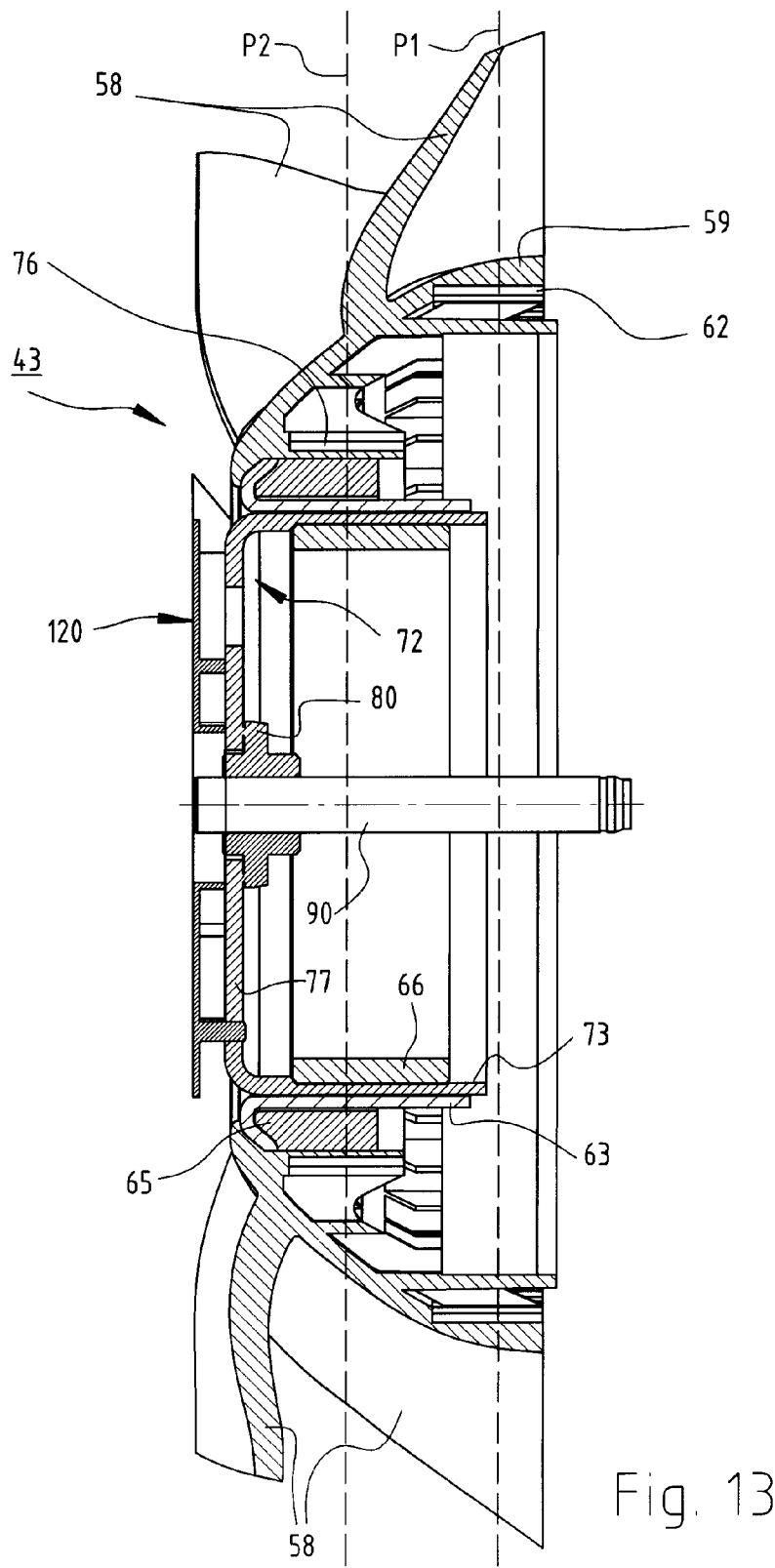
Figure 14:
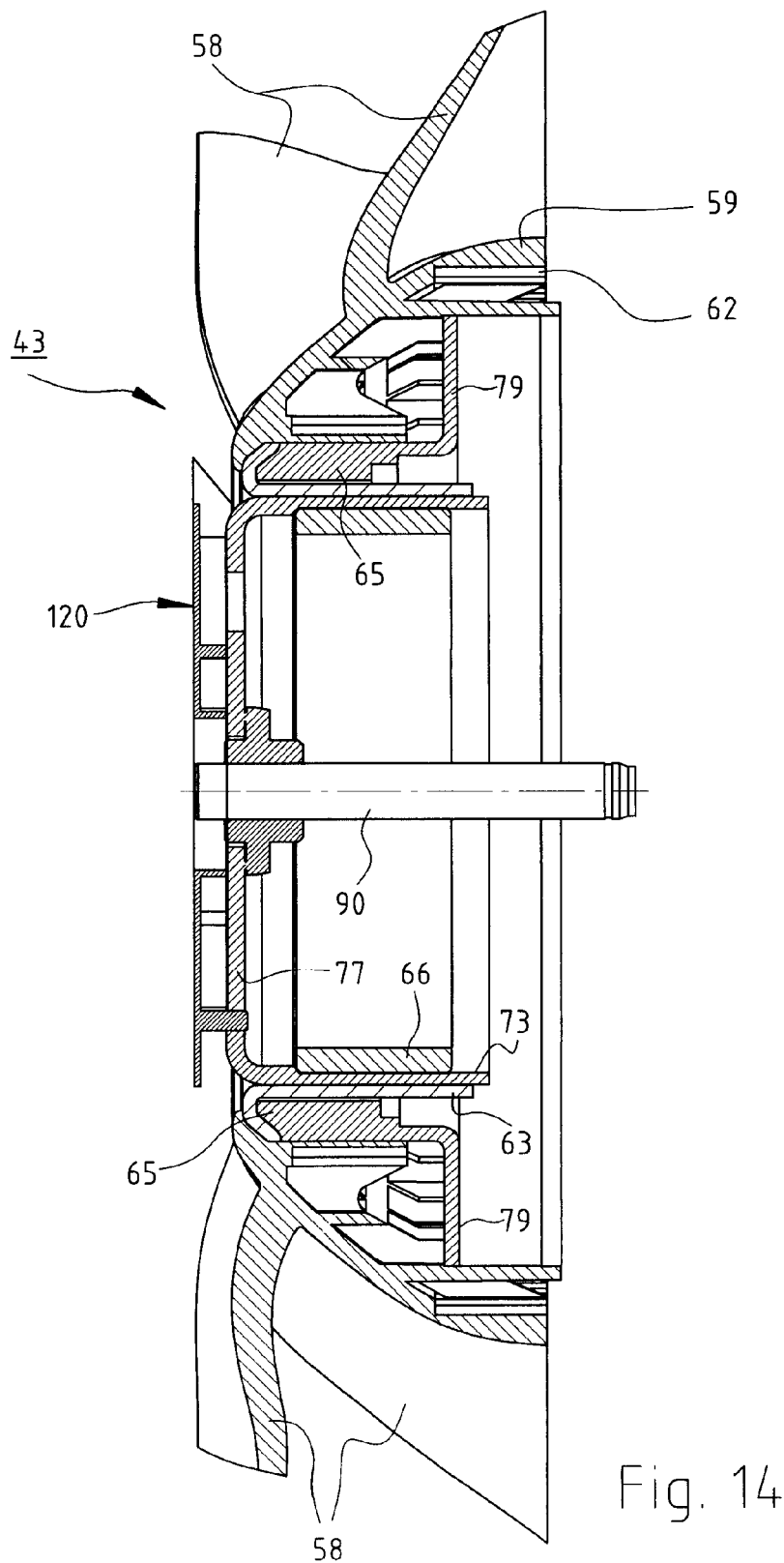

FIG. 1 is a three-dimensional depiction of a preferred embodiment of a mixed flow fan, FIG. 2 is an exploded depiction of parts of the fan and its axis, FIG. 3 is a plan view of the upper side of the fan, and of the impeller mounted on the rotor, in the context of the mixed flow fan of FIG. 1, looking in the direction of arrow III of FIG. 1, FIG. 4 is a plan view of the lower side of the rotor and the impeller of the fan of FIG. 3, and of the networked or ribbed vault provided there, FIG. 5 shows a highly enlarged portion of FIG. 4, FIG. 6 is a three-dimensional depiction of the ribbed vault of FIGS. 4 and 5, FIG. 7 shows an enlarged portion of FIG. 6, FIG. 8 is a three-dimensional depiction analogous to FIG. 7, FIG. 9 is a three-dimensional depiction analogous to FIG. 6, FIG. 10 is a longitudinal section through the blank of an impeller in the state prior to installation thereof, according to a preferred embodiment of the invention, looking along line X-X of FIG. 3, FIG. 11 is a longitudinal section, analogous to FIG. 10, during press-fitting of the external rotor into the impeller, FIG. 12 depicts the impeller, after the external rotor has been press-fitted, but before installation of a radial fan wheel whose function is to transport cooling air through the drive motor of the mixed flow fan, FIG. 13 is a longitudinal section through a first variant of the impeller, and FIG. 14 is a longitudinal section through a second variant of the impeller.

DETAILED DESCRIPTION

FIG. 1 is a perspective depiction of a mixed flow fan 40, and FIG. 2 shows parts of such a fan in an exploded view, in order to facilitate comprehension.

Fan 40 has a housing 42 in which a fan rotor 43, which is usually referred to as an "impeller," is arranged. A plastic part 46 is installed in housing 42 on inlet side 44. This part defines the outer edge or wall of an air conduit 50 that extends from inlet 44, in a frusto-conical manner, to an air discharge outlet 52. Housing 42 has an upper part 53 that is connected, via connecting elements 45, to a base part 47 through which an electrical connector lead 49 extends outward. Base part 47 is highlighted in gray.

The inner edge or wall of air conduit 50 is defined by the approximately dome-shaped or spherical-cap-shaped outer surface 56 of fan rotor 43 (FIG. 2). Fan blades 58 are mounted on this outer side 56. They rotate in the direction of an arrow 60, i.e. clockwise with reference to FIGS. 1 and 2. The flow direction of the air is indicated by an arrow 61, i.e. air is driven from top to bottom in FIG. 1.

Fan rotor 43 has at the bottom, in FIGS. 10 and 11, an approximately cylindrical portion 59 on whose inner side are provided balancing pockets 62 for a first balancing plane orthogonal to the rotor axis. In a balancing operation, so-called balance weights (not shown) are inserted into these pockets, in a manner known to having ordinary skill in the art. Alternatively, other methods can also be used for balancing.

Blades 58 are preferably arranged in an overlapping configuration. Together with fan rotor 43, they form the impeller of fan 40. The impeller is preferably manufactured by plastic casting. Mounted in it is a portion of a tubular yoke 63, made of ferromagnetic material, that extends almost to the upper side of impeller 43. Part 63 is part of a magnetic return path for a rotor magnet 66 that is shown in FIG. 2.

At its outer (left) end in FIG. 10, tubular part 63 is deformed into an outwardly projecting flange or rim 67 that is, for example, embedded into material of impeller 43 and thereby anchored therein. For example, rim 67 can be placed in plastic which later hardens.

Tubular part 63 is also referred to as a "circular blank." It defines, within its inner surface, a cavity 68 having a wall 70. Provided on wall 70 are flat elevations or bosses 71 that can have, for example, a height of approximately 0.1 to approximately 0.3 mm and a diameter of, for example, 5 mm. Approximately six elevations 71 are usually sufficient; in FIG. 10 they are arranged adjacent the left end of part 63, and are distributed evenly around the circumference of part 63.

As FIG. 11 shows, the cup-shaped magnetic yoke 72 of an external rotor 81 is press-fitted, from the right, into cavity 68 in the interior of tubular part 63. Serving this purpose is a press-fit force F1 that is exerted by a suitable auxiliary tool (not shown) onto the cup-shaped yoke 72.

In order to enable press-fitting, tubular part 63 is braced by means of a counterforce F2 that engages against the outwardly projecting rim 67 of part 63. This rim 67 is therefore not located in the interior of impeller 43, i.e. is not cast into it, so that a retainer (not shown) can engage against the rim 67 and can exert counterforce F2 onto part 63.

Impeller 43 has for this reason, on its upper (in FIG. 1) side 44, an annular opening 76' through which direct access to rim 67 is possible. If applicable, this annular opening 76' can also be implemented in the form of a plurality of shorter openings, through which corresponding parts of a retainer can be introduced.

When external rotor 81 is press-fitted, its outer side 73 is what is principally pressed into the flat elevations or bumps 71 and thereby securely connected to tubular part 63. Rotor magnet 66 is mounted, in a suitable manner, in the interior of cup-shaped part 72.

FIGS. 13 and 14 show variations of impeller 43 that are particularly suitable for experimental prototypes. In FIG. 13, tubular yoke part 63 is mounted in impeller 43 by means of a press-fitted or bonded-in plastic ring 65. Ring 65 is press-fitted or bonded in between part 63 and the inner wall of impeller 43, and abuts with its left end (as shown in FIGS. 13 and 14) against rim 67 from the inside.

In FIG. 14, plastic ring 65 also has a flange extension 79 that covers the hollow inner side of impeller 43, and thus reduces losses due to air turbulence.

The bottom of yoke part 72 is labeled 77. A shaft 90 is mounted on it, by means of a welded bushing 80 (see also FIG. 2). This makes it possible for tubular part 63 and for rotor 43 to thermally expand, independently of one another.

A cup-shaped yoke 72, made of ferromagnetic material, shown in FIG. 2, is press-fitted into tubular part 63. This yoke has an approximately cylindrical wall 73, and its bottom is labeled 77 (see FIG. 4). Rotor magnet 66 is arranged on the inner wall of yoke part 72 (see FIGS. 2, 4, 10, and 11). The magnet is preferably radially magnetized. Its number of poles can be, for example, 2, 4, 6, 8, 10, etc. poles, depending upon requirements. In principle, any type of electric motor can be used to drive the fan rotor, but the compact form depicted and described has proven particularly advantageous.

Impeller 43 has, on the right in FIG. 10, an approximately cylindrical portion 59 on whose inner side are provided balancing pockets 62 for a first balancing plane orthogonal to the rotor axis. So-called balance weights (not shown) are inserted, as needed, into these pockets, in the context of a balancing operation.

Blades 58 are preferably arranged in an overlapping configuration. Together with support structure 54, they form impeller 43 of fan 40. Impeller 43 is preferably manufactured by plastic molding and, if applicable, could also be assembled from a plurality of parts, for example by splitting in an axial direction.

Impeller 43 has, on its inner side, a cylindrical extension 70' (see FIG. 5) that serves for mounting of the cup-shaped magnetic yoke 72 (FIG. 2). This cylindrical extension 70' transitions, via an annular connecting part 74, into the support structure of impeller 43 (see FIG. 8).

Provided in connecting part 74 are second balancing pockets 76 (FIGS. 4 and 5) in a second balancing plane orthogonal to the rotor axis, which pockets are at an axial distance and a radial distance from first balancing pockets 62. They make possible balancing in two parallel spatially-separated planes, from the same side of impeller 43.

This kind of configuration of fan 40 thus makes it possible to balance impeller 43 from a single side, namely the air-discharge side visible in FIGS. 5 to 9, so that no balancing pockets need to be provided on outer side 56 (FIG. 10) of impeller 43. This enables an optimal conformation of impeller 43, and of its fan blades 58, the radially inner ends of which latter can be located closer to rotation axis 78 (FIG. 2) of impeller 43, thus providing noise minimization advantages; in other words, the so-called "attachment area" of fan blades 58 on impeller 43 can be particularly large in this case, which also improves aerodynamic efficiency.

Fan blades 58 can also have an S-shaped profile 80 on their leading edges (FIG. 3), and can have indentations 82 (FIG. 2); this likewise contributes to a reduction in fan noise.

As FIGS. 4 to 9 show, ribs 83 are provided between cylindrical extension 70' and cylindrical portion 60. This enables the use of a small air gap between wall 48 of air conduit 50 and the outer ends of blades 58 (see FIG. 1).

Fan 40 is driven by an electronically commutated external-rotor motor (ECM) 75. Magnetic yoke 72 of the rotor is, as described, connected to cylindrical extension 70' of connecting part 74. It is, in turn, drivingly connected to a shaft 90 that is journaled in a bearing tube 92, in this case by means of two ball bearings 94, 96 that are tensioned against one another by means of a compression spring (not shown). Magnetic yoke 72 rotates around longitudinal axis 78 during operation.

Motor 75 has an internal stator 100 that is mounted on the outer side of bearing tube 92. Located in this instance below internal stator 100 is a circuit board 102 on which electronic components for motor 75 can be arranged. Bearing tube 92 is connected to a flange plate 106 that is in turn connected to external housing 42 in a suitable manner, usually by way of struts 103, one of which is visible in FIG. 1.

In practice, the bearing tube 92, struts 103, flange 106, and fan housing 42 can be formed as a one-piece pressure-cast aluminum part or a one-piece plastic part. A multi-part embodiment is also possible.

Because external-rotor motor 75 is arranged in the interior of impeller 43, it is relatively poorly cooled. An additional fan arrangement 120 similar to a disk is therefore preferably provided above motor 75, and in this case is driven directly by shaft 90. It sits directly on external rotor 72 and draws in air through openings 122 that are provided there (see FIG. 2).

This air first flows through motor 75 and cools it. During operation, mixed flow fan 40 of FIG. 1 has, at the top, a first lower pressure and, at the bottom, a higher second pressure, which pushes air upward through motor 75 and thereby cools it.

From motor 75, the cooling air flows through openings 122 of cup-shaped part 72 to air disk 120, which is configured as a radial blower wheel. It reinforces the effect of the second pressure and draws air through openings 122.

Air disk 120 can either be manufactured directly (e.g. by injection molding) on impeller 43 upon manufacture of the latter, or can be mounted on impeller 43. Cooling air is blown out radially from air disk 120 through exit openings 126 (FIG. 1).

Mixed flow fan 40 has, on its air inlet side 44, adjacent disk 120, a low pressure that is usually somewhat lower than the first pressure, since air is being drawn in there to inlet opening 44. This drawn-in air flows through exit openings 126 and generates there, as a result of the Venturi effect, an additional negative pressure that intensifies the flow of cooling air through motor 75 and thereby further improves the cooling thereof. The pressure generated on exhaust side 52 by the fan itself also additionally intensifies the cooling effect.

As FIGS. 4 to 9 show, first ribs 130 extend outward from inner extension 70' to part 60. Ribs 130 each extend here from a portion between two inner balancing pockets 76, through cavity 144, to an approximately oppositely located portion between two outer balancing pockets 62. In FIG. 5, one of the ribs 130 is highlighted in gray.

Extending perpendicular to first ribs 130 (here, in a circumferential direction) are second ribs 132, 134 which form, with first ribs 130, a kind of ribbed vault and are connected to the first ribs at intersection points 142. First ribs 130 and second ribs 132, 134 form, with each other, small cavities 136 that, during the operation of fan 40, cannot cause any substantial turbulence and therefore cannot cause any large losses.

First ribs 130 have angular spacings of approximately 5° to approximately 20°. As FIGS. 6 and 7 show, the shape is adapted to the shape of cavity 144 in the interior of impeller 44. The number of second ribs 132, 134 is based, among other factors, on the space situation, i.e. the size and output of mixed flow fan 40.

The configuration of ribs 130, 132, 134 thus results, without substantial additional cost, in an improvement in the performance of mixed flow fan 40, since turbulence in the interior of impeller 66 becomes greatly reduced.

Many variants and modifications are of course possible, within the scope of the present invention.

What is claimed is:

1. A mixed flow fan, comprising:
   a fan housing (42);
   an impeller (43) that is equipped with fan blades (54) and is journaled rotatably relative to the fan housing (42);
   an air conduit (50) that extends between the fan housing (42) and impeller (43), having an inlet side (44) and an outlet side (52), and into which the fan blades (54) extend, in order, during operation, to transport air through said air conduit (50);
   an external-rotor motor (75) having an internal stator (100) and an external rotor (81), which latter comprises a tubular ferromagnetic yoke (63) that is embedded with part of its longitudinal extension into a central part of the impeller (43) on the latter's inlet side (44) and defines a central cavity (68) in the impeller (43);
   a cup-shaped magnetic yoke (72) having an approximately cylindrical rim (73) and a bottom (77), which cup-shaped yoke (72) is arranged in the central cavity (68) defined by the tubular ferromagnetic yoke (63), and on whose inner side a permanent magnet arrangement (66) of the external-rotor motor (75) is mounted in such a way that said permanent magnet arrangement interacts with the internal stator (100), the tubular ferromagnetic yoke (63) forming, together with the generally cylindrical rim (73) of the cup-shaped magnetic yoke (72), a ferromagnetic return path for the external-rotor motor (75).

2. The mixed flow fan according to claim 1, wherein the cup-shaped magnetic yoke (72) is mounted in the tubular magnetic yoke (63).

3. The mixed flow fan according to claim 1, wherein
first balancing pockets (76) are provided on an inner side of the impeller (43), and, in order to permit, during manufacture of the fan, insertion of balancing weights into selected ones of said first balancing pockets (76), each pocket has an end, facing toward an air exhaust side (52) of the fan, which end is at least temporarily open to permit said insertion, said pockets being arranged on the inner side of the impeller (43) in a first plane adjacent the air inlet (44),
and second balancing pockets (62), which are arranged on said inner side of the impeller (43) in a second plane adjacent the air outlet (52) and are accessible from the air exhaust side (52) of the impeller (43).

4. The mixed flow fan according to claim 3, wherein
first ribs (130) are provided on the inner side of the impeller (43), which ribs each extend from a portion of the impeller (43) that is located at the first balancing pockets (76) to a portion of the impeller (43) that is located at the second balancing pockets (62),
and at least one second rib (132, 134), extending in a circumferential direction, is provided, which rib connects together at least some of the first ribs (130) at at least one portion (142) that is located radially between the first balancing pockets (76) and the second balancing pockets (62).

5. The mixed flow fan according to claim 4, wherein
the first ribs (130) are arranged in the impeller (43) at angular spacings from approximately 5° to approximately 20°.

6. The mixed flow fan according to claim 4, wherein
the shape of the first ribs (130) follows a shape of an interior space (144) through which said ribs (130) extend.

7. The mixed flow fan according to claim 4, wherein
the first ribs (130) are fixedly connected, on their side facing toward the interior space (144) of the impeller (43), to said interior space.

8. The mixed flow fan according to claim 1, wherein
the tubular ferromagnetic yoke (63) extends in the impeller (43), radially inside balancing pockets (62), and at a radial distance from them, which balancing pockets are provided on the inner side of the impeller (43).

9. The mixed flow fan according to claim 1, wherein
a shaft (90) for the impeller (43) is mounted on a bottom (77) of the cup-shaped ferromagnetic part (72).

10. The mixed flow fan according to claim 1, wherein
a disk-shaped radial fan wheel (120) is mounted on a side of the cup-shaped part (72) which faces toward the air inlet (44), which fan wheel is configured to draw cooling air through the external-rotor motor (75) and to thereby cool the latter when, during operation, the external rotor rotates.

11. The mixed flow fan according to claim 10, wherein
at least one opening (122), through which the disk-shaped radial fan wheel (120) draws in cooling air during operation, is provided in a bottom (77) of the cup-shaped ferromagnetic part (72).

12. A mixed flow fan, comprising:
an air conduit (50) having an air inlet (44) and an air outlet (52), as well as an outer wall (48) and an inner wall (56);
an external-rotor motor (75) having an internal stator (100) and an external rotor;
an impeller (43) that is equipped with blades (58) that are arranged on a support structure (54) drivingly connected to the external rotor, which structure forms an inner wall (56) of the air conduit (50), into which air conduit (50) the blades (58) of the impeller (43) extend;
first balancing pockets (76) that are accessible from an exhaust side (52) of the impeller (43) and are arranged on an inner side of the impeller (43) in a first plane adjacent the air inlet (44);
second balancing pockets (62) that are arranged on the inner side of the impeller (43) in a second plane adjacent the air outlet (52) and are likewise accessible from an exhaust side (52) of the impeller (43);
first ribs (130) that each extend from a portion of the impeller (43) that is located between the first balancing pockets (76) to a portion of the impeller (43) that is located between the second balancing pockets (62); and
at least one second rib (132, 134), extending in a circumferential direction, that connects at least some of the first ribs (130) to one another at at least one portion (142) that is located radially between the first balancing pockets (76) and the second balancing pockets (62).

13. The mixed flow fan according to claim 12, wherein
the first ribs (130) are arranged in the impeller (43) at angular spacings from approximately 5° to approximately 20°.

14. The mixed flow fan according to claim 12, wherein
the shape of the first ribs (130) is adapted to the shape of a cavity (144) through which said ribs (130) extend.

15. The mixed flow fan according to claim 14, in which
the first ribs (130) are fixedly connected, on their side facing toward the cavity (144), to said cavity.

16. The mixed flow fan according to claim 12, wherein
a cup-shaped ferromagnetic part (72) is mounted in the impeller (43) in a region inside the second balancing pockets (62),
which part forms a magnetic return path for a permanent magnet (138) arranged in said cup-shaped ferromagnetic part (72).

17. The mixed flow fan according to claim 16, wherein the shaft (90) of the external rotor is mounted on a bottom of said cup-shaped part.

18. The mixed flow fan according to claim 16, wherein a disk-shaped radial fan wheel (120) is mounted on a side of the cup-shaped part which faces toward the air inlet (44), which fan wheel is implemented to draw cooling air through the external-rotor motor (75) and thereby to cool said motor when, during operation, the external rotor rotates.

19. The mixed flow fan according to claim 18, wherein
at least one opening (122), which enables cooling air to be drawn in through the disk-shaped radial fan wheel (120), is provided in a bottom of the cup-shaped part (72).

20. A mixed flow fan, comprising:
a fan housing (42);
an impeller (43) that is equipped with fan blades (54) and is rotatably journaled relative to the fan housing (42);
an air conduit (50) that extends between the fan housing (42) and impeller (43), said air conduit having an air inlet side (44) and an air outlet side (52), and into which the fan blades (54) extend, in order to transport air through said air conduit (50) during operation;
an external-rotor motor (75) having an internal stator (100) and an external rotor, which latter comprises a tubular ferromagnetic yoke (63) that comprises, in the region of one of its ends, a widened region (67) that is mounted in a central part of the impeller (43) on the inlet side (44) thereof, the tubular ferromagnetic yoke (63) defining a central cavity (68) in the impeller (43);
a cup-shaped ferromagnetic yoke (72) having a substantially cylindrical rim (73) and a bottom (77), which cup-shaped yoke (72) is mounted in the central cavity (68) defined by the tubular ferromagnetic yoke (63) and on whose inner side is mounted a permanent magnet arrangement (66) of the external-rotor motor (75), in such a way that said permanent magnet arrangement (66) interacts with the internal stator (100), the widened region (67) of the tubular ferromagnetic yoke (63) being accessible, at least in part, from an outer side of the impeller (43) so that, upon mounting of the cup-shaped ferromagnetic yoke (52), said accessible region (67) can be braced from the outer side of the impeller (43).

21. The mixed flow fan according to claim 20, wherein the tubular ferromagnetic yoke (63) defines, as a widened region (67), a region standing out approximately radially outward that is suitable for bracing of motor parts during motor assembly.

22. The mixed flow fan according to claim 20, wherein the inner side (70), facing toward the cup-shaped ferromagnetic yoke (72), of the tubular ferromagnetic yoke (63) is equipped with inwardly projecting protrusions (71) that, upon mounting of the cup-shaped ferromagnetic yoke (72), form a press fit with the latter.

23. The mixed flow fan according to claim 22, wherein the inwardly projecting protrusions are implemented as round, flat regions (71) having a diameter that is in a range between 3 mm and 10 mm.

24. The mixed flow fan according to claim 20, wherein the impeller (43) is configured from plastic, and
the widened region (67) of the tubular ferromagnetic yoke (63) is mounted, at least in part, in the plastic of the impeller (43).

* * * * *